(12) United States Patent
Idera et al.

(10) Patent No.: US 11,348,333 B2
(45) Date of Patent: May 31, 2022

(54) PACKAGE RECOGNITION DEVICE, PACKAGE SORTING SYSTEM AND PACKAGE RECOGNITION METHOD

(71) Applicant: PANASONIC INTELLECTUAL PROPERTY MANAGEMENT CO., LTD., Osaka (JP)

(72) Inventors: Takaaki Idera, Kanagawa (JP); Takaaki Moriyama, Kanagawa (JP); Shohji Ohtsubo, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 315 days.

(21) Appl. No.: 16/648,968

(22) PCT Filed: Jul. 6, 2018

(86) PCT No.: PCT/JP2018/025736
§ 371 (c)(1),
(2) Date: Mar. 19, 2020

(87) PCT Pub. No.: WO2019/064803
PCT Pub. Date: Apr. 4, 2019

(65) Prior Publication Data
US 2020/0285850 A1 Sep. 10, 2020

(30) Foreign Application Priority Data
Sep. 27, 2017 (JP) .............................. JP2017-187200

(51) Int. Cl.
*G06K 9/00* (2022.01)
*G06V 20/20* (2022.01)
(Continued)

(52) U.S. Cl.
CPC .............. *G06V 20/20* (2022.01); *B07C 3/14* (2013.01); *B07C 7/005* (2013.01); *G06T 7/70* (2017.01);
(Continued)

(58) Field of Classification Search
CPC ...... B07C 3/14; B07C 7/005; G06K 9/00771; G06K 9/00288; G06K 9/00268;
(Continued)

(56) References Cited

U.S. PATENT DOCUMENTS 6,011,635 A * 1/2000 Bungo ................. H04N 1/3873
358/463
7,090,134 B2 8/2006 Ramsager
(Continued)

OTHER PUBLICATIONS

International Search Report issued in International Patent Application No. PCT/JP2018/025736, dated Oct. 9, 2018.

*Primary Examiner* — Tom Y Lu
(74) *Attorney, Agent, or Firm* — Greenblum & Bernstein, P.L.C.

(57) ABSTRACT

There is provided a parcel recognition device that recognizes a parcel based on an image including the parcel, the device including: a processor; and a memory, in which by cooperating with the memory, the processor recognizes a person in a recognition target space in the image, subtracts a space within a predetermined range including at least a part of the recognized person from the recognition target space, and recognizes the parcel by using a space obtained by the subtraction as a new recognition target space.

9 Claims, 7 Drawing Sheets

(51) Int. Cl.
  *G06T 7/70* (2017.01)
  *B07C 3/14* (2006.01)
  *B07C 7/00* (2006.01)
  *G08B 21/18* (2006.01)
  *G06V 10/40* (2022.01)
  *G06V 30/10* (2022.01)

(52) U.S. Cl.
  CPC ............. *G06V 10/40* (2022.01); *G08B 21/18* (2013.01); *G06T 2207/10024* (2013.01); *G06T 2207/30196* (2013.01); *G06T 2207/30242* (2013.01); *G06V 30/10* (2022.01)

(58) Field of Classification Search
  CPC .... G06K 9/00221; G06K 9/46; G06K 9/6253; G06K 9/00228; G06K 2209/01; G06K 9/00671; G06K 2009/00328; G06K 9/00362; G06K 9/00335; G06K 9/00718; G06K 9/2054; G06K 9/6202; G06K 2009/00322; G06K 9/00255; G06K 9/00369; G06K 9/00744; G06K 9/38; G06K 9/6218; G06K 2009/00395; G06K 2009/00932; G06K 9/00013; G06K 9/00087; G06K 9/00295; G06K 9/00315; G06K 9/00382; G06K 9/00711; G06K 9/00765; G06K 9/00778; G06K 9/00885; G06K 9/22; G06K 9/42; G06K 9/4604; G06K 9/4652; G06K 9/4671; G06K 9/469; G06K 9/6201; G06K 9/6215; G06K 9/6232; G06K 9/6267; G06K 9/6293; G06K 2209/013; G06K 2209/21; G06K 7/1413; G06K 9/00; G06K 9/00275; G06K 9/00302; G06K 9/00342; G06K 9/00355; G06K 9/00469; G06K 9/00677; G06K 9/00751; G06K 9/00758; G06K 9/00899; G06K 9/00906; G06K 9/3233; G06K 9/3241; G06K 9/3258; G06K 9/344; G06K 9/36; G06K 9/4628; G06K 9/6211; G06K 9/6256; G06K 9/66; G06K 9/78; G06K 7/00; G06K 5/00; G06K 3/00; G06K 1/00; G06T 7/00; G06T 2207/30196; G06T 2207/10024; G06T 2207/30242; G06T 7/70; G06T 11/60; G06T 2207/10016; G06T 2207/30232; G06T 7/11; G06T 2207/20081; G06T 7/90; G06T 2207/10004; G06T 2207/20032; G06T 2207/30141; G06T 5/002; G06T 7/0002; G06T 7/0004; G06T 7/194; G06T 7/246; G06T 11/80; G06T 2207/20021; G06T 2207/20084; G06T 2207/20221; G06T 2207/20224; G06T 2207/30112; G06T 2207/30148; G06T 2207/30204; G06T 2207/30241; G06T 3/0093; G06T 3/40; G06T 5/005; G06T 5/008; G06T 5/30; G06T 7/0008; G06T 7/001; G06T 7/10; G06T 7/155; G06T 7/20; G06T 7/292; G06T 7/536; G06T 7/85
  See application file for complete search history.

(56) References Cited

U.S. PATENT DOCUMENTS

| | | | | |
|---|---|---|---|---|
| 9,646,369 | B2* | 5/2017 | Salzman | .................... G06T 7/70 |
| 10,471,478 | B2* | 11/2019 | Gil | ......................... B65G 15/30 |
| 2006/0007304 | A1* | 1/2006 | Anderson | .......... G06K 17/0022 |
| | | | | 348/91 |
| 2015/0262348 | A1* | 9/2015 | Salzman | ............... G06T 7/0004 |
| | | | | 348/94 |

* cited by examiner

PACKAGE RECOGNITION DEVICE, PACKAGE SORTING SYSTEM AND PACKAGE RECOGNITION METHOD

TECHNICAL FIELD

The present disclosure is related to a parcel recognition device, a parcel sorting system, and a parcel recognition method useful to sort parcels.

BACKGROUND ART

As recent economic activity rises, the amount of parcel circulation tends to increase. In a circulation process of parcels, sorting work for sorting the parcel by destination is a time-consuming process and relies on manual work from before, but a technology of automating at least a part of the sorting work is proposed.

PTL 1 discloses a system in which a moving parcel is tracked, an image to be displayed is determined based on information related to the parcel read from the parcel and information of a position of the parcel, and the image is projected from a projector to display the image on the parcel.

CITATION LIST

Patent Literature

PTL 1: U.S. Pat. No. 7,090,134

SUMMARY OF THE INVENTION

Meanwhile, in recent years, the amount of parcel circulation has been increased more and more and types of parcels have also become various, so that a technology of effectively and precisely sorting the parcel is required.

The present disclosure is related to the technology of effectively and precisely sorting the parcel.

According to the present disclosure, there is provided a parcel recognition device that recognizes a parcel based on an image including the parcel, the device including: a processor; and a memory, in which by cooperating with the memory, the processor recognizes a person in a recognition target space in the image, subtracts a space within a predetermined range including at least a part of the recognized person from the recognition target space, and recognizes the parcel by using a space obtained by the subtraction as a new recognition target space.

According to the present disclosure, there is provided a parcel sorting system including: a projection instruction device including the parcel recognition device described above; a label reader that reads parcel identification information from a label attached to a parcel; an image sensor that obtains an image including the parcel; and an image projection device that projects a projection image indicating a sorting destination on the parcel.

According to the present disclosure, there is provided a parcel recognition method of recognizing a parcel based on an image including the parcel, the method including: by causing a processor to cooperate with a memory, performing a recognition on a person in a recognition target space in the image; subtracting a space within a predetermined range including at least a part of the recognized person from the recognition target space; and setting a space obtained by the subtraction as a new recognition target space, and recognizing the parcel.

According to the present disclosure, it is possible to more effectively and precisely sort parcels and to further deal with an increase in the amount of parcel circulation. In particular, even if a person touches a parcel and interferes with the parcel, an error in position information of the parcel and occurrence of erroneous recognition can be suppressed, and it is possible to more reliably recognize the parcel and to further track the parcel with high accuracy.

DESCRIPTION OF EMBODIMENTS

Hereinafter, embodiments (hereinafter, referred to as "present embodiment") which specifically disclose a parcel recognition device, a parcel sorting system, and a parcel recognition method according to the present disclosure will be described in detail with reference to appropriate drawings. Meanwhile, in some cases, an unnecessarily detailed explanation may be omitted. For example, in some cases, a detailed explanation of already well-known items and a repetition explanation of substantially the same configuration may be omitted. This is to avoid unnecessary repetition of the following description and to facilitate understanding by those skilled in the art. The accompanying drawings and the following description are provided to enable those skilled in the art to fully understand the present disclosure and are not intended to limit a scope of the claims.

Hereinafter, the embodiments of the disclosure will be described with reference to FIGS. 1 to 7.

[Configuration]

Figure 1:
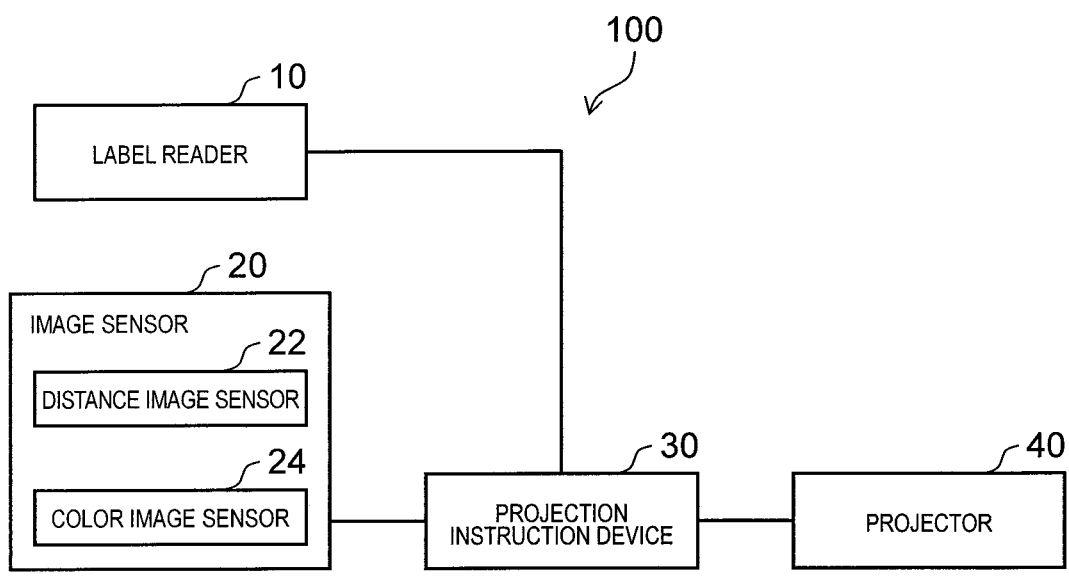
FIG. 1 is a block diagram illustrating a configuration of a parcel sorting system according to an embodiment.

FIG. 1 is a block diagram illustrating a configuration of the parcel sorting system according to the embodiment. Parcel sorting system 100 illustrated in FIG. 1 is installed in, for example, a distribution center. Parcel sorting system 100 includes label reader 10, image sensor 20, projection instruction device 30, and projector 40. Parcel sorting system 100 is a system which supports work of a worker who sorts parcels transported by a transport conveyor. Parcel sorting system 100 is installed at the distribution center owned by, for example, a retailer, a wholesaler, an internet distributor, or the like. A parcel to be sorted generally has an approximately rectangular parallelepiped shape, but the outward shape of the parcel is not particularly limited, and a type of the parcel is also not particularly limited. The configuration of the parcel sorting system is not limited to the configuration illustrated in FIG. 1. For example, one label reader 10 may be connected with a plurality of image sensors 20, a plurality of projection instruction devices 30, and a plurality of projectors 40. The number of each component can be appropriately modified according to the purpose.

Label reader 10 as a reading device is a device which includes various components such as a lens (not illustrated), an image sensor, and the like. By using label reader 10, it is possible to read label recording information recording various types of information related to the parcel from a label attached to the parcel transported by the transport conveyor. By using the read label recording information, it becomes possible to specify the parcel. By the read information, parcel identification information is defined.

Image sensor 20 is an imaging device which includes various components such as a lens (not illustrated), an image sensor, and the like. Image sensor 20 is generally configured by an imaging camera. The imaging camera is a three-dimensional camera, a plurality of two-dimensional cameras, or the like. Image sensor 20 includes distance image sensor 22 and color image sensor 24.

Distance image sensor 22 images the parcel transported by the transport conveyor and generates a distance image. The generated distance image is used as information indicating a position of the parcel, a distance to the parcel, a size of the parcel, and the like. "Distance image" means an image including distance information indicating a distance from an imaging position to a position (including a surface of a parcel) indicated by each of pixels (that is, "image" in the present disclosure includes a distance image). In addition, a term of "distance image" includes one which cannot be recognized as an image by human eyes, such as a table or the like listing numerical values indicating a distance. That is, "distance image" may be information indicating a relationship between coordinates and a distance in the imaged region, and a data structure is not limited thereto. In the present disclosure, distance image sensor 22 is used for specifying the position of the parcel. Therefore, distance image sensor 22 also can be replaced with another sensing device (an ultrasonic sensor, an infrared sensor, a stereo camera, and a monocular video camera).

Color image sensor 24 images a parcel generated by the distance image and generates a color image. "Color image" refers to an image in which a color of a surface of a parcel is expressed with a predetermined gradation, and the "gradation" includes not only 256 gradations of RGB but also all kinds of grayscales or the like. Color image sensor 24 in the present disclosure is used for tracking each parcel, for the parcel specified by distance image sensor 22. Color image sensor 24 also can be replaced with another sensing device (an ultrasonic sensor, an infrared sensor, a stereo camera, and a monocular video camera).

That is, in the present disclosure, a term of "image" includes both of a distance image and a color image. In the present disclosure, information output from an image sensor as a sensing device including a distance image sensor and a color image sensor is referred to as sensing information. In the present embodiment, an example of the sensing device will be described by using image sensor 20 (including distance image sensor 22 and color image sensor 24). In addition, in the present embodiment, an example of the sensing information will be described by using a distance image output by distance image sensor 22 and a color image output by color image sensor 24.

Figure 2:
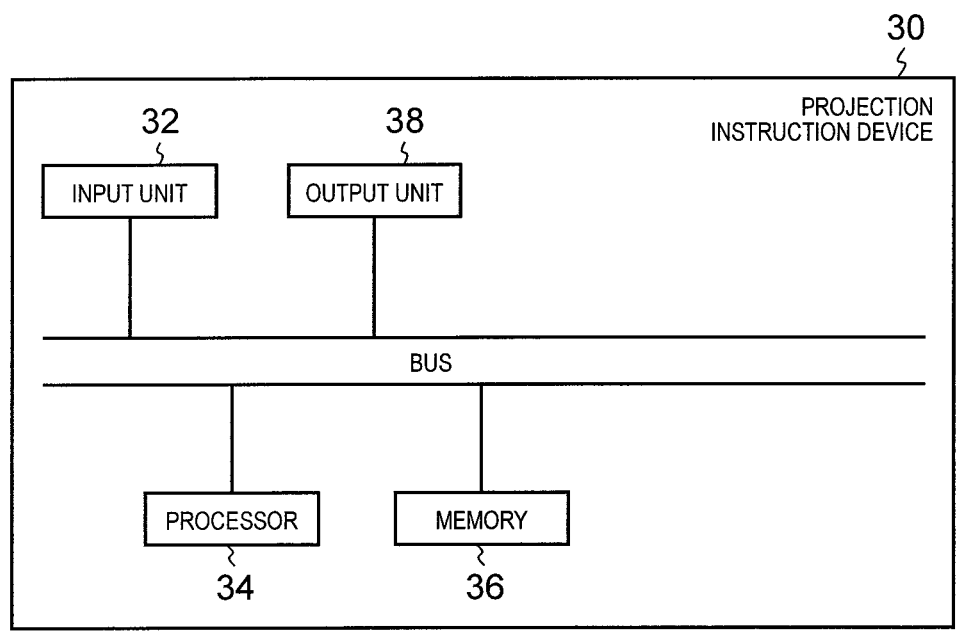
FIG. 2 is a block diagram illustrating a configuration of a projection instruction device according to the embodiment.

Projection instruction device 30 functions as a calculation device in parcel sorting system 100. As illustrated in FIG. 2, projection instruction device 30 includes input unit 32, processor 34, memory 36, and output unit 38 connected with one another via a bus. Input unit 32 receives parcel identification information for specifying a parcel obtained from the label recording information read by label reader 10, a distance image generated by distance image sensor 22, and a color image generated by color image sensor 24. Processor 34 is configured by a general calculation device and generates a projection image to be projected on a parcel based on the parcel identification information, the distance image, and the color image. Memory 36 as a storage device reads a control program necessary for various processes by processor 34 and performs an operation such as data backup. That is, processor 34 and memory 36 control various processes by projection instruction device 30 by cooperating with each other. Output unit 38 outputs the projection image generated by processor 34 to projector 40. In the present disclosure, "processor" does not mean only a single processor. "Processor" means an operator having a plurality of processors having an identical purpose, or a plurality of processors having different purposes in a case where they perform processes in collaboration with one another (for example, general-purpose central processing unit (CPU) and a graphic processing unit (GPU)).

Projector 40 is configured by a general projection device, and projects projection light including the projection image received from projection instruction device 30, on the parcel and displays the projection image onto the parcel.

Parcel sorting system 100 can be configured to include label reader 10, image sensor 20 (distance image sensor 22 and color image sensor 24), projection instruction device 30, and projector 40 connected with one another in wired communication or in wireless communication. In addition, parcel sorting system 100 also can be configured to include two or more devices of any of label reader 10, image sensor 20, projection instruction device 30, and projector 40 as an integral device. For example, image sensor 20 and projector 40 can be combined to construct an integral imaging projection device (see FIG. 3A).

[Outline of System]

Figure 3A:
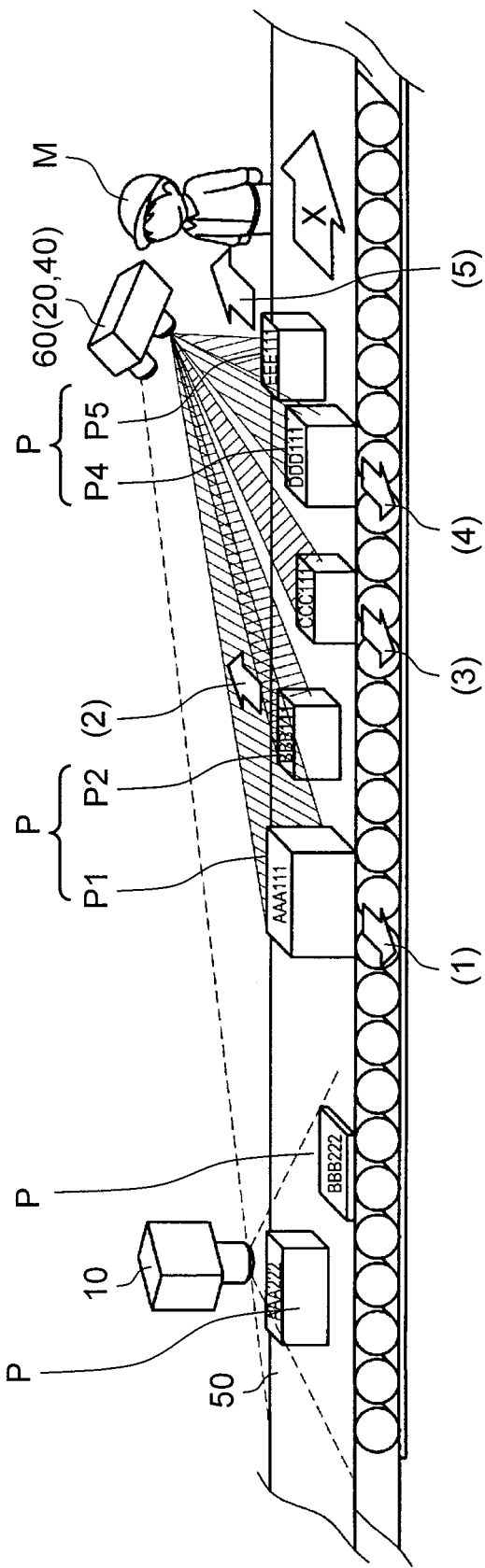
FIG. 3A is a conceptual diagram illustrating a status in which the parcel sorting system is installed in a distribution center and is in operation.

FIG. 3A is a conceptual diagram illustrating a status in which parcel sorting system 100 is installed in the distribution center and is in operation. In the related art, each of workers M visually checks the label attached to each parcel P transported by transport conveyor 50 in the arrow X-direction. When the parcel to be delivered by the worker himself arrives, worker M needs to pick up the parcel and places the parcel once in the vicinity such as the worker's own feet, a basket, a truck bed. Meanwhile, in a case of visually sorting by the worker, there is a limit in work efficiency of the worker, so that it is necessary to limit a transport speed to a predetermined value or less. As a result, a limit value of the number of parcels which the worker can sort in a unit time, was few. In addition, due to an erroneous recognition when the worker visually checks the label, there is a possibility that an error may occur at the time of sorting. In recent years, the amount of parcel circulation has increased, and these problems receive more attention.

In the present embodiment, as illustrated in FIG. 3A, label reader 10 disposed above transport conveyor 50 reads the label attached to each parcel P transported by transport conveyor 50. In the label, the label recording information including various information related to the parcel is described. The label recording information includes information similar to a parcel identification number individually assigned to the parcel, a name, an address, and a telephone number of a sender, a name, an address, and a telephone number of a receiver, a parcel type, and the like. The label may be read by the worker in charge by manually placing a barcode reader as label reader 10 to a barcode in the label.

Further, image sensor 20 images the image (the distance image and the color image) of parcel P transported by transport conveyor 50 and obtains information such as a position of parcel P, a distance to parcel P, a size (lengths of three sides when parcel P is rectangular parallelepiped) of parcel P, a color of parcel P, a pattern of parcel P, and the like. Further, positions of label reader 10 and image sensor 20, a type of the sensing device, and an order of processes are not particularly limited to the illustrated embodiments. As described above, in the present example, image sensor 20 and projector 40 are configured as integrated imaging projection device 60 and are disposed above transport conveyor 50.

Projection instruction device 30 (not illustrated in FIGS. 3A and 3B) is configured by a computer disposed in, for example, the vicinity of transport conveyor 50 or another room and generates the projection image to be displayed on parcel P (for example, upper surface when parcel P is rectangular parallelepiped) based on the information, obtained by label reader 10, specifying the parcel and the distance image and the color image generated by image sensor 20. Projection instruction device 30 transmits a projection instruction to project the projection image on parcel P, to projector 40.

Figure 3B:
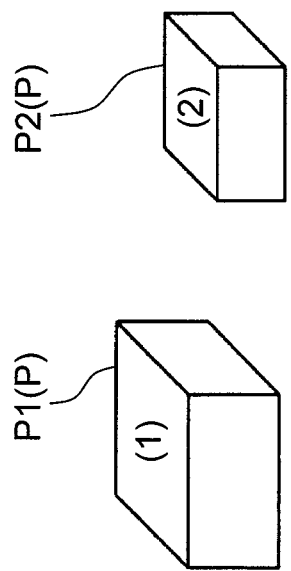
FIG. 3B is a diagram illustrating a state in which a projection image including a number is projected on an upper surface of a parcel.
Figure 4:
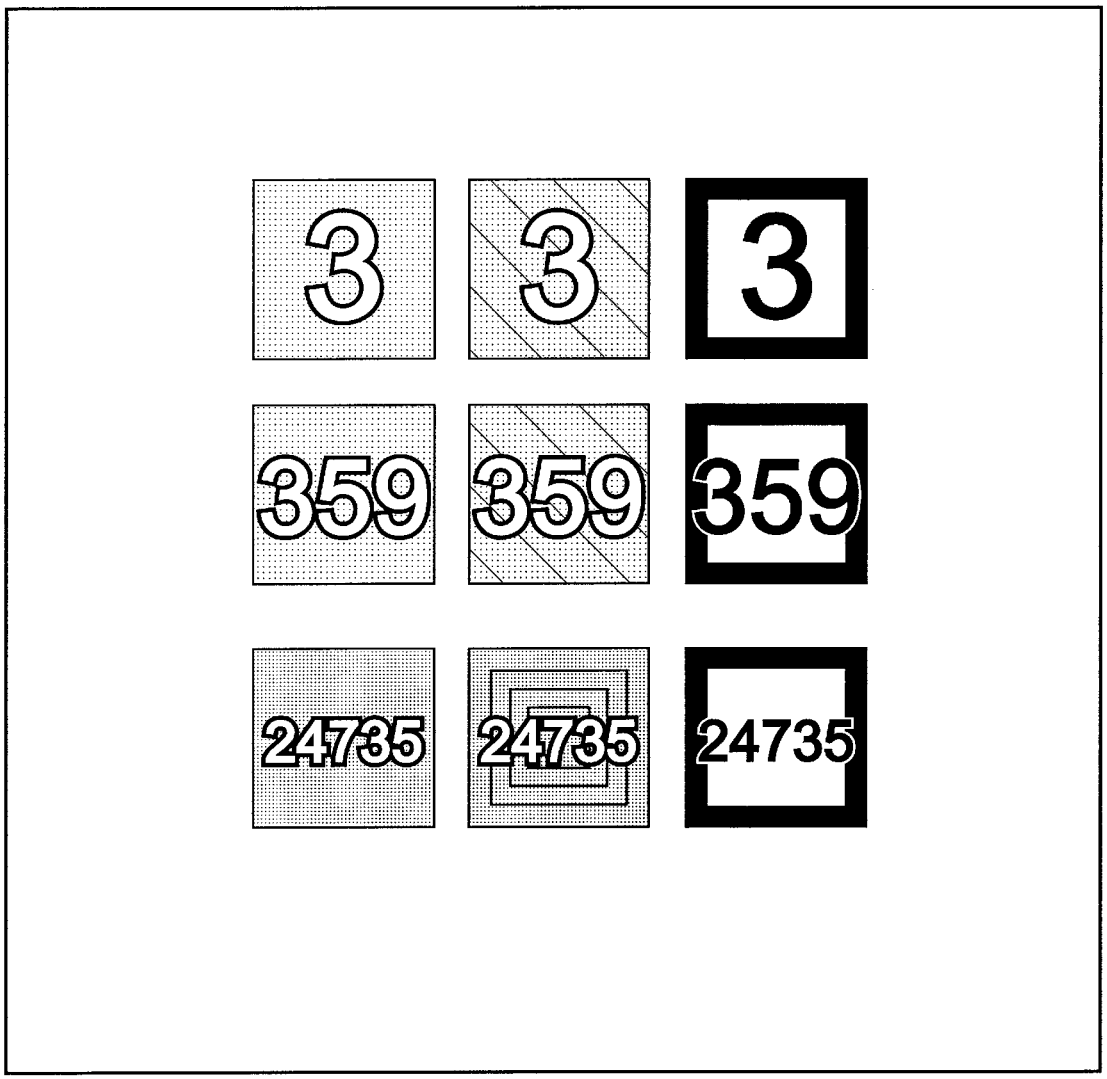
FIG. 4 is a diagram illustrating an example of a projection image generated by the projection instruction device according to the embodiment.

Projector 40 which receives the projection instruction, as an image projection device, projects projection light including the projection image generated by projection instruction device 30 on parcel P and displays the projection image on parcel P. Here, the projection image displayed on parcel P is, for example, an image of an encircled number having a color indicating a sorting location corresponding to a delivery address of parcel P (see FIG. 3B). Here, the encircled number corresponds to, for example, a number of a truck carrying sorted parcel P (a number of the truck itself, a parking lot number, or the like), a number of a shelf or a box to be carried into the truck, or the like. Further, instead of directly corresponding to the number such as the shelf or the box, the encircled number may correspond to a number of a shooter which moves the picked-up parcel to another location or a truck. Since a parking position of the truck or the like frequently changes according to a traffic condition or the like, it may be difficult to correspond to the sorting destination viewed from the periphery of transport conveyor 50 at any time. Therefore, the shooter is sandwiched between transport conveyor 50 and the transport truck, and a number of the shooter is projected on the periphery of transport conveyor 50, so that even if a configuration on the periphery of the transport conveyor 50 is not changed as needed, it is possible to deal with the change of the sorting destination by disposing an opening of the shooter. Certainly, according to a status, various types of projection images are displayed. Another example of displaying the number may be a zip code corresponding to the delivery address, a number of a worker who picks up parcel P, or the like. In addition, as an example of displaying information other than the number, an arrow indicating the sorting direction (such as right or left in a transport direction of transport conveyor 50) or characters (such as "left" and "right") may be used. Further, a display form is not limited to the encircled number, and various types such as numbers surrounded by squares ("3", "359", and "24735") as illustrated in FIG. 4 are conceivable. Furthermore, the projection image is not limited to numbers or characters enclosed with a frame, but may be white numbers or characters with a solid background. In addition, the shape of the number or character to be displayed such as a circle, a triangle, a square, or the like may be switched according to information to be displayed. Further, a picture capable of being individually associated with each information to be displayed may be displayed. The projection image is not limited to a still image, and may be an animation. As an example of the animation, the example described above may be blinked, enlarged or reduced, and a color may be changed. An animation reflecting the sorting direction may be projected. An example of the animations reflecting the sorting direction may include various patterns, for example, a moving light ray or light spot in the sorting direction, forming all or a part of the projection image in the sorting direction, changing the color, moving and displaying an arrow in the sorting direction, and the like. In a case where only a part of the projection image is a target of the animation, a part having a large influence on determination of the sorting destination by a worker, such as a number, an arrow, or the like, may be not changed, and a part not affected by the sorting destination such as a frame line may be changed. Meanwhile, in a situation in which it is more efficient to convey the sorting direction more intuitively than the meaning of the number or the like projected within the frame line, such as a case where there are few options for the sorting destination, a number, an arrow, or the like may be moved in the sorting direction within a fixed frame line. The animation may be repeatedly projected or may be projected only once. In the present disclosure, "image projection device" is not limited to a device which directly projects a light beam on the parcel. In the present disclosure, "image projection device" includes glasses which can display the image. That is, in the present disclosure, in a case of expressing as projecting projection light on the parcel, displaying the image on the parcel, projecting the image on the parcel, or the like, the expression also includes allowing the worker to recognize the image via the glasses capable of displaying the image in a pseudo manner as if the projection light is projected on the parcel. That is, in a case where the worker wears special glasses capable of displaying the image, the projection image of parcel P may be superimposed on the image of parcel P viewed via the glasses.

In FIG. 3A, worker M (omitted for other workers) in charge of picking up the parcel stands beside transport conveyor 50 and the parcel arriving each region is picked up from transport conveyor 50 as indicated by encircled number 1, encircled number 2, encircled number 3, or the like.

For example, parcel P1 has parcel identification information of "AAA111" on a label, and the parcel identification information of "AAA111" specifies that the parcel is a target to be sorted in region A. Here, when parcel P1 reaches the specific region, processor 34 transmits the generated projection image to projector 40 as illustrated in FIG. 3B. Projector 40 projects the projection image on parcel P1. The worker in the region can easily pay attention to parcel P1, to be picked up by the worker, which reaches the specific region of the worker, accordingly, the parcel can be sorted more efficiently and precisely.

In the present embodiment, as illustrated in FIG. 3A, whether or not one projector 40 projects the image on a plurality of specific regions may be switched and whether or not a plurality of projectors 40 project the image on each of the specific regions may be switched.

Hereinafter, in parcel sorting system 100 according to the embodiment, an outline of an operation of sorting the parcel performed by projection instruction device 30 will be described.

[Outline of Operation]

Figure 5:
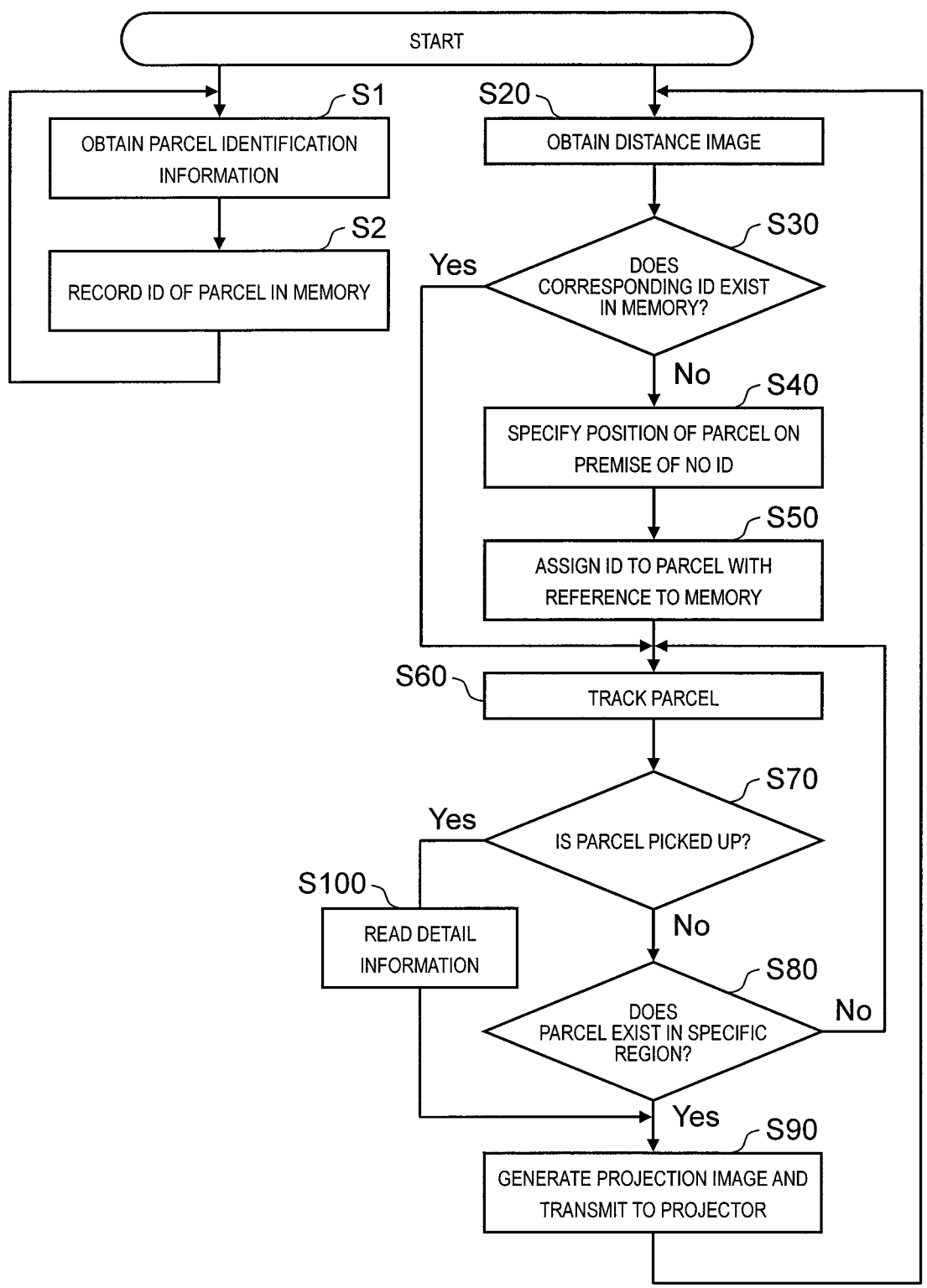
FIG. 5 is a flowchart illustrating an outline procedure of an operation mainly performed by the projection instruction device.

FIG. 5 is a flowchart illustrating an outline procedure of an operation of mainly performed by projection instruction device 30 of the present embodiment, particularly processor 34 of projection instruction device 30. First, after label reader 10 reads the label recording information of the label of the parcel, input unit 32 of projection instruction device 30 obtains the parcel identification information corresponding to the label recording information from label reader 10 (step S1). The parcel identification information is information including at least one piece of information similar to the parcel identification number individually assigned to the parcel, the name, the address, and the telephone number of the sender, the name, the address, and the telephone number of the receiver, the parcel type, and the like. For the parcel identification information, processor 34 assigns an ID as a parcel identification number specifying the parcel and records the ID and time information corresponding to a time at which the ID is assigned, in memory 36 (step S2). The ID recorded in memory 36 may be the parcel identification number originally recorded in the parcel identification information or may be assigned by projection instruction device 30 generating a new ID.

On the other hand, in parallel with step S1 and step S2, after distance image sensor 22 of image sensor 20 images the distance image of the parcel, input unit 32 of projection instruction device 30 obtains the distance image as the sensing information from distance image sensor 22 (step S20). Processor 34 determines whether or not the ID corresponding to the parcel existing in the distance image exists in memory 36.

An example of a method of determining whether or not the ID corresponding to the parcel existing in the distance image exists in memory 36 is as follows. That is, processor 34 calculates a time required for the parcel to move between label reader 10 and distance image sensor 22 by a distance (assumed to be known) between label reader 10 and distance image sensor 22 and a speed of transport conveyor 50. By subtracting the time from a time when the distance image is obtained, a time when the ID is assigned to the parcel existing in the distance image by label reader 10 (or processor 34) can be estimated. It can be estimated that the ID assigned close to the estimated time is the ID corresponding to the parcel existing in the distance image. In addition, as another example, a method of installing another distance image sensor in the vicinity of label reader 10 may be possible. That is, by tracking the parcel, to which the ID is assigned, by using another distance image sensor installed in the vicinity of label reader 10 since label reader 10 assigns the ID (or processor 34), a distance between the parcel (or the ID) and label reader 10 is measured for a time unit. Processor 34 can estimate the ID of the parcel in the distance image obtained in predetermined step S20 by the measured distance between the parcel (or the ID) and label reader 10, a distance of the parcel in the distance image obtained in step S20, and a distance (assumed to be known) between two distance image sensors.

In this manner, processor 34 determines whether or not the ID corresponding to the parcel included in the distance image exists in memory 36 (step S30). That is, as described in step S2, in memory 36, the parcel identification information, the ID, and the time information corresponding to a time when the ID is assigned are recorded in advance. On the other hand, as described above, for example, processor 34 subtracts the time required for the parcel to move between label reader 10 and distance image sensor 22 from the time when the distance image is obtained, a time when the ID is assigned to the parcel existing in the distance image by label reader 10 (or processor 34) can be estimated. Processor 34 compares the time information recorded in memory 36 in advance and the estimated time. In a case where the time information is close to the estimated time (for example, a case where a time difference is equal to or smaller than a predetermined threshold time), processor 34 can determine that the ID corresponding to the parcel included in the distance image exists in memory 36. In a case where it is determined that the ID corresponding to the parcel exists in memory 36 (Yes in step S30), the process moves to step S60 and subsequent steps.

In a case where it is determined that the ID corresponding to the parcel does not exist in memory 36 (No in step S30), on the premise that the ID is not assigned to the parcel, processor 34 specifies the position of the parcel again (step S40) and assigns the ID to the parcel (step S50).

In parallel with the above steps, color image sensor 24 generates a color image for each parcel of which a distance image is obtained. Processor 34 tracks the parcel, to which the ID is attached, transported and moved by transport conveyor 50 based on the color image from color image sensor 24 obtained by input unit 32 (step S60). Based on the color image likewise, processor 34 determines whether or not the worker picks up the tracked parcel (step S70). In a case where it is determined that the parcel is not picked up by the worker (No in step S70), processor 34 determines whether or not the parcel exists in a specific region (a predetermined sorting area in which the parcel is to be picked up) to be described below. In a case where it is determined that the parcel exists (reaches) in the specific region (Yes in step S80), processor 34 generates the projection image and transmits the projection image to projector 40 (step S90). In a case where it is not determined that the parcel exists (reaches) in the specific region (No in step S80), the process returns to step S60 and processor 34 continues to track the parcel.

In addition, in step S70, in a case where it is determined that the parcel is picked up by the worker (Yes in step S70), processor 34 reads detail information of the parcel from memory 36 (step S100), generates the projection image including the detail information, and outputs the projection image generated by output unit 38, to projector 40 (step S90). Projector 40 which obtains the projection image from projection instruction device 30, projects the projection image on the corresponding parcel.

The above is the outline of the operation procedure performed by processor 34 and the like of projection instruction device 30. Certainly, the operation procedure is not limited to that described above. For example, the determination in step S70 can be omitted. In addition, for the determination in step S70, it is possible to use contact determination between a hand of the worker and the parcel, a color image, a distance image, or the like. Hereinafter, further detailed procedures of each process will be described.

[Process in Case where Person Interferes with Parcel]

In a case where a parcel is recognized based on a distance image including the parcel, if a person touches the parcel and interferes with the parcel, an error may occur in position information or an erroneous recognition may occur. For example, when a person is in contact with a parcel, the arm of the person is also recognized as a part of the parcel, and a shape or the like of the parcel may be erroneously recognized. In such a case, there is a possibility that the parcel cannot be accurately tracked.

In the present disclosure, in step S60 in FIG. 5, a person is recognized in a recognition target space inside a distance image, a space within a predetermined range around the recognized person is subtracted from the recognition target space, and a space obtained by the subtraction is set as a new recognition target space so that the parcel is reliably recognized.

That is, in a recognition target space inside a distance image including a parcel which is an output of distance image sensor 22, as sensing information, processor 34 recognizes a person by using an existing image recognition technology, then, subtracts a space within a predetermined range around the recognized person from the recognition target space, and sets a space obtained by the subtraction as a new recognition target space, so that the parcel is recognized in the new recognition target space.

Figure 6:
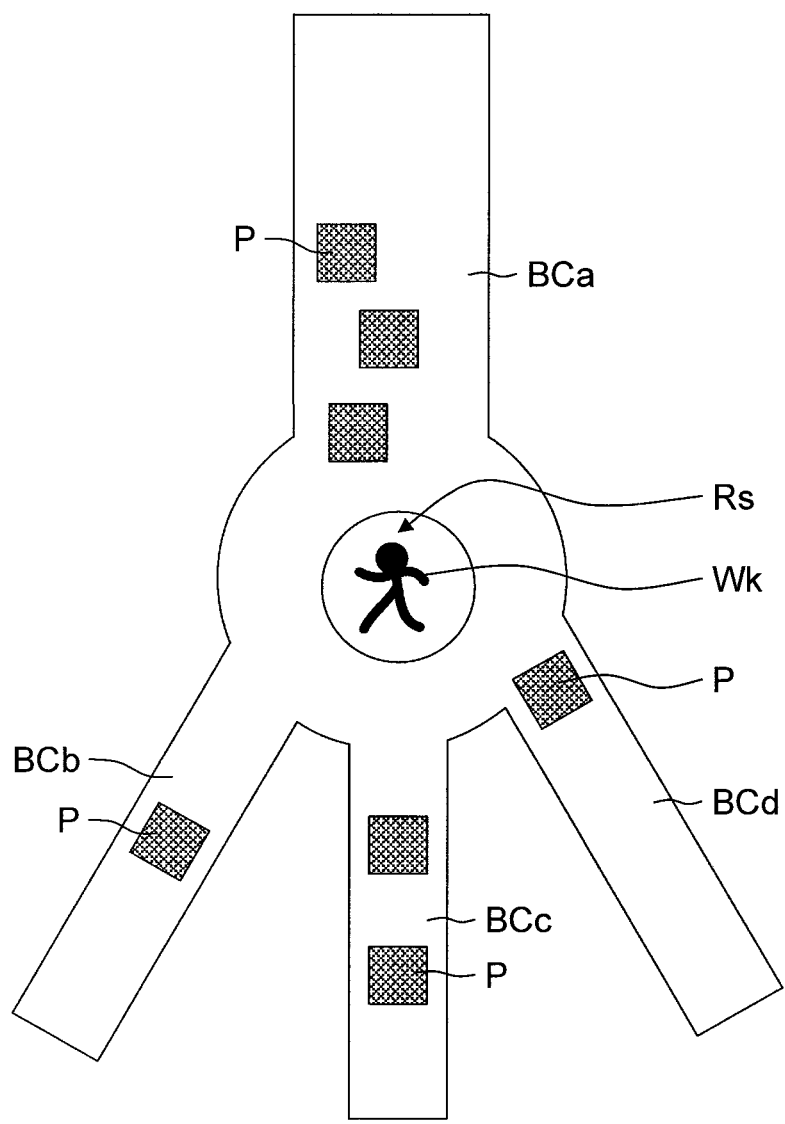
FIG. 6 is a diagram for explaining a recognition process for a parcel in a case where a person interferes with the parcel.

FIG. 6 is a diagram for explaining a recognition process for a parcel in a case where a person interferes with the parcel. In the drawing, in a case where there is one transport conveyor BCa on the upstream side and three transport conveyors BCb to BCd on the downstream side, person Wk (worker) disposed between transport conveyor BCa and three transport conveyors BCb to BCd picks up parcel P transported by transport conveyor BCa on the upstream side, and performs sorting work of placing parcel P on one of transport conveyor BCb, transport conveyor BCc, and transport conveyor BCd. In such sorting work, when person Wk touches parcel P transported by transport conveyor BCa and interferes with parcel P, an error may occur in parcel information or an erroneous recognition may occur. In such a case, person Wk is first recognized, then predetermined range Rs around person Wk is determined, and a space within determined predetermined range Rs is subtracted from the recognition target space. A space obtained in this manner is set as a new recognition target space. In this manner, even if person Wk touches parcel P and interferes with parcel P, an error in position information of parcel P or occurrence of erroneous recognition can be suppressed, and it is possible to more reliably recognize parcel P and to further track the parcel with high accuracy. Various methods can be used for recognizing person Wk. For example, if it is enough to roughly recognize a position at which person Wk exists, the position of person Wk may be recognized by a tag or a beacon attached to clothes of person Wk, a uniform having a specific color or a shape, and the like being recognized. On the other hand, if it is necessary to more accurately recognize the position of person Wk, another algorithm such as pattern matching may be used. Further, both methods may be used in combination. In order to determine range Rs accurately, it is desirable to accurately recognize the position of person Wk. Meanwhile, an algorithm for accurately recognizing the position of person Wk generally has lower accuracy in situations in which person Wk is at a distant position or when a plurality of persons Wk densely exist. Here, by using both methods together, it is possible to realize a structure for recognizing person Wk existing in the recognition target section as completely as possible and with high accuracy.

Figure 7:
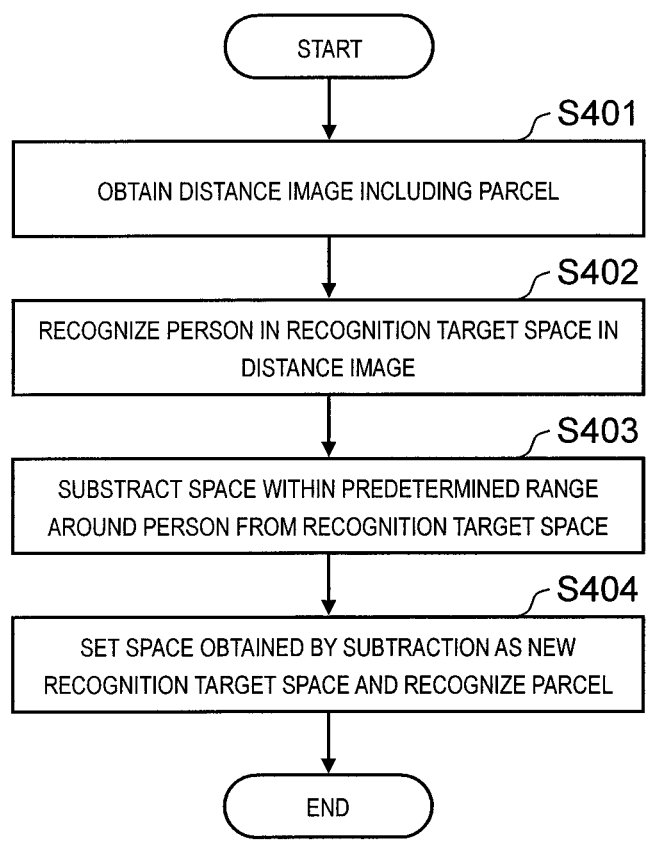
FIG. 7 is a flowchart illustrating the recognition process for a parcel in a case where a person interferes with the parcel.

FIG. 7 is an example of a flow corresponding to the process described above. The flow illustrated here indicates a parcel recognition process which is a sub-process (a subroutine) of the process in step S60 in the flowchart of the outline procedure in FIG. 5. That is, processor 34 first obtains a distance image including a parcel from distance image sensor 22 (step S401). Next, processor 34 recognizes person Wk by using an existing image recognition technology, in a recognition target space in the obtained distance image (step S402). After recognizing person Wk, processor 34 subtracts a space within predetermined range Rs around recognized person Wk from the recognition target space (step S403). A space obtained by the subtraction is set as a new recognition target space, and parcel P is recognized (step S404). After recognizing parcel P by performing the above sub-process, processor 34 performs a process of tracking parcel P.

As described above, according to the present disclosure, even if person Wk touches parcel P transported by a transport conveyor and interferes with parcel P, an error in position information of parcel P or occurrence of erroneous recognition can be suppressed, and it is possible to more reliably recognize parcel P and to further track the parcel with high accuracy.

Instead of using a distance image, it is also possible to use a color image to recognize a person and a space within a predetermined range around the person.

Although the embodiment of a parcel recognition device, a parcel sorting system, and a parcel recognition method according to the present disclosure is described with reference to the drawings, the present disclosure is not limited to such an example. Those skilled in the art can conceive various modification examples, change examples, substitution examples, addition examples, deletion examples, and equivalent examples within the scope described in the claims and these rightly belong to the technical scope of the present disclosure.

For example, the following modification example can be considered.

In the present disclosure, the situation is assumed in which person Wk exists at a center portion of a plurality of transport conveyors as illustrated in FIG. 6, but the present disclosure is not limited thereto. The present disclosure can be applied to a case where person Wk exists near one transport conveyor as illustrated in FIG. 3. Even in the situation as illustrated in FIG. 3, a situation occurs in which a person who tries to pick up a parcel is erroneously recognized as a parcel, so that the technology of the present disclosure is useful.

In the present disclosure, person Wk is excluded from the recognition target space of the distance image, but the present disclosure is not limited thereto. For example, person Wk may be excluded from a recognition target space of a color image. In a case where a color of clothes of the person is similar to a color of the parcel, not only in a recognition result of the distance image but also in a recognition result of the color image, there is a possibility that a shape of the parcel and a shape of the person are erroneously recognized as being integrated. In the present disclosure, since the parcel is tracked based on the color image, if such erroneous recognition occurs, a tracking error of the parcel occurs. By excluding person Wk from the color image, such a tracking error can be suppressed.

In the present disclosure, as illustrated in FIG. 6, a columnar shape surrounding person Wk is used as range Rs to be excluded from the recognition target space, but the range is not limited thereto. If person Wk is excluded from the recognition target space, a size or a shape of range Rs may be different from those in FIG. 6. In addition, since it is only for preventing erroneous recognition of the parcel and person Wk, it is not necessary to exclude whole person Wk, and for example, only the arm in contact with the parcel may be excluded. Further, the size and the shape of range Rs may be switched according to at least one of the number of persons Wk and the number of parcels assumed to exist in the recognition target space. That is, in a case where the number of persons Wk is small or the number of parcels is small, it is more beneficial to set wider range Rs to surely exclude person Wk from the recognition target space. On the other hand, in a case where the number of persons Wk is large or the number of parcels is large, excluded range Rs may overlap with a position at which the parcel exists, and tracking of the parcel itself may fail. Therefore, in a case where the number of persons Wk is large or the number of parcel is large, it is useful to set range Rs as close as possible to a shape of person Wk itself or as a narrower range. The number of parcels existing in the recognition space can be estimated from the number of parcels successfully recognized at the immediately preceding timing.

In the present disclosure, recognized person Wk is used for the purpose of excluding recognized person Wk from the recognition target space, but the disclosure is not limited thereto. For example, in the configuration as illustrated in FIG. 6, recognized person Wk may be used for a purpose or the like of determining whether or not a parcel picked up by person Wk is moved to an appropriate transport conveyor. In the present disclosure, since range Rs including person Wk can be recognized, the parcel picked up by person Wk can be specified by specifying the parcel overlapping with range Rs. In addition, if tracking of the parcel is successful, it is possible to determine which transport conveyor is a correct destination for each parcel. Therefore, by using these methods, it is possible to determine whether or not person Wk moves the picked-up parcel to an appropriate transport conveyor. In this case, if the parcel is moved to an erroneous transport conveyor, a parcel sorting system may notify recognized person Wk of a warning by means such as a voice, a projection image, or the like. Although the example in which a destination of the parcel is the transport conveyor is described with reference to FIG. 6, this method can also be applied to an example in which the parcel is moved to another destination such as a shooter or a transport truck.

INDUSTRIAL APPLICABILITY

The present disclosure is useful to provide a parcel recognition device, a parcel sorting system, and a parcel recognition method capable of reliably recognizing a parcel even if a person touches the parcel transported by a transport conveyor and interferes with the parcel.

REFERENCE MARKS IN THE DRAWINGS

10 LABEL READER
20 IMAGE SENSOR
22 DISTANCE IMAGE SENSOR
24 COLOR IMAGE SENSOR
30 PROJECTION INSTRUCTION DEVICE
32 INPUT UNIT
34 PROCESSOR
36 MEMORY
38 OUTPUT UNIT
40 PROJECTOR
50 TRANSPORT CONVEYOR
60 IMAGING PROJECTION DEVICE
100 PARCEL SORTING SYSTEM
P PARCEL

The invention claimed is:

1. A parcel recognition device that recognizes a parcel based on an image including the parcel, the device comprising:
a processor; and
a memory,
wherein by cooperating with the memory, the processor
recognizes a person in a recognition target space in the image,
subtracts a space within a predetermined range including at least a part of the recognized person from the recognition target space, and
recognizes the parcel by using a space obtained by the subtraction as a new recognition target space.

2. The parcel recognition device of claim 1,
wherein the processor
subtracts a space including the whole recognized person from the recognition target space.

3. The parcel recognition device of claim 1,
wherein the processor
changes at least one of a size or a shape of a range to be subtracted from the recognition target space corresponding to each person, according to the number of the recognized persons.

4. The parcel recognition device of claim 1,
wherein the processor
estimates the number of parcels existing in the recognition target space and changes at least one of a size or a shape of a range to be subtracted from the recognition target space, according to the number of the estimated parcels.

5. The parcel recognition device of claim 1,
wherein the processor
specifies a correct sorting destination of the parcel in a case where a range to be subtracted from the recognition target space and the recognized parcel overlap with each other, and
performs a warning when the parcel is not sorted into the correct sorting destination.

6. The parcel recognition device of claim 1,
wherein the image is a distance image.

7. The parcel recognition device of claim 1,
wherein the image is a color image.

8. A parcel sorting system comprising:
a projection instruction device including the parcel recognition device according to claim 1;
a label reader that reads parcel identification information from a label attached to a parcel;
an image sensor that obtains an image including the parcel; and
an image projection device that projects a projection image indicating a sorting destination on the parcel.

9. A parcel recognition method of recognizing a parcel based on an image including the parcel, the method comprising:
by causing a processor to cooperate with a memory,
recognizing a person in a recognition target space in the image;
subtracting a space within a predetermined range including at least a part of the recognized person from the recognition target space; and
recognizing the parcel by using a space obtained by the subtraction as a new recognition target space.

* * * * *